(12) United States Patent
Kim

(10) Patent No.: US 9,717,002 B2
(45) Date of Patent: Jul. 25, 2017

(54) MOBILE DEVICE DIGITAL COMMUNICATION AND AUTHENTICATION METHODS

(71) Applicant: Moon J. Kim, Palo Alto, CA (US)

(72) Inventor: Moon J. Kim, Palo Alto, CA (US)

(*) Notice: Subject to any disclaimer, the term of this patent is extended or adjusted under 35 U.S.C. 154(b) by 0 days.

(21) Appl. No.: 14/798,787

(22) Filed: Jul. 14, 2015

(65) Prior Publication Data

US 2015/0319616 A1 Nov. 5, 2015

Related U.S. Application Data

(62) Division of application No. 13/412,792, filed on Mar. 6, 2012, now Pat. No. 9,143,936.

(51) Int. Cl.

| | |
|---|---|
| *H04W 12/06* | (2009.01) |
| *H04W 76/02* | (2009.01) |
| *H04L 29/06* | (2006.01) |
| *G06K 7/14* | (2006.01) |
| *H04L 9/32* | (2006.01) |
| *G06F 21/36* | (2013.01) |
| *H04W 4/00* | (2009.01) |

(52) U.S. Cl.
CPC .......... *H04W 12/06* (2013.01); *G06K 7/1447* (2013.01); *H04L 63/0492* (2013.01); *H04L 63/061* (2013.01); *H04W 76/02* (2013.01); *G06F 21/36* (2013.01); *H04L 9/3228* (2013.01); *H04L 63/0846* (2013.01); *H04W 4/008* (2013.01)

(58) Field of Classification Search
CPC .......... G06F 21/44; G06F 21/45; G06F 21/36; H04L 63/0846; H04L 9/3228
See application file for complete search history.

(56) References Cited

U.S. PATENT DOCUMENTS

| | | |
|---|---|---|
| 5,073,954 A | 12/1991 | Van Tyne et al. |
| 5,278,397 A | 1/1994 | Barkan et al. |

(Continued)

OTHER PUBLICATIONS

Devan A. Sandiford, USPTO Office Action, U.S. Appl. No. 13/412,792, Notification Date Feb. 25, 2014, 43 pages.

(Continued)

*Primary Examiner* — Devan Sandiford
(74) *Attorney, Agent, or Firm* — Madeline F. Schiesser; Keohane & D'Alessandro, PLLC

(57) ABSTRACT

Embodiments of the present invention provide various approaches for mobile device intercommunication (e.g., digital) as well as various authentication methods. In one embodiment, the present invention provides direct line-of-sight visual digital communication between mobile devices for controlled security. In another embodiment, the present invention provides direct contact motion-based digital communication between mobile devices for controlled security. Embodiments of the present invention also provide various authentication methods. One such example relates to secure authentication code exchange with subsequent digital communications in one or more channels. In another example, human-readable information is used along machine-readable digital codes (e.g., quick response (QR) codes to verify visual codes. Still yet, embodiments of the present invention provide non-obtrusive visual codes that maintain a user's access to a mobile device screen.

14 Claims, 11 Drawing Sheets

(56) References Cited

U.S. PATENT DOCUMENTS

| | | | |
|---|---|---|---|
| 5,591,952 A | 1/1997 | Krichever et al. | |
| 7,089,420 B1* | 8/2006 | Durst | G09C 5/00 283/72 |
| 7,162,035 B1* | 1/2007 | Durst | G06K 19/086 380/54 |
| 7,273,180 B2 | 9/2007 | Zhu et al. | |
| 7,360,706 B2 | 4/2008 | Zhu et al. | |
| 7,578,436 B1 | 8/2009 | Kiliccote | |
| 7,946,493 B2 | 5/2011 | Havens et al. | |
| 8,256,673 B1 | 9/2012 | Kim | |
| 8,408,462 B2 | 4/2013 | Kim | |
| 8,418,922 B1 | 4/2013 | Kim | |
| 2002/0099942 A1 | 7/2002 | Gohl | |
| 2005/0005102 A1 | 1/2005 | Meggitt et al. | |
| 2005/0038756 A1* | 2/2005 | Nagel | G06K 19/086 705/76 |
| 2005/0199699 A1 | 9/2005 | Sato et al. | |
| 2005/0246536 A1* | 11/2005 | Roberts | G06Q 20/342 713/176 |
| 2006/0002610 A1 | 1/2006 | Suomela et al. | |
| 2006/0052058 A1 | 3/2006 | Lai et al. | |
| 2006/0054695 A1 | 3/2006 | Owada | |
| 2006/0071077 A1 | 4/2006 | Suomela et al. | |
| 2006/0101280 A1 | 5/2006 | Sakai | |
| 2007/0019616 A1 | 1/2007 | Rantapuska et al. | |
| 2007/0021065 A1 | 1/2007 | Sengupta et al. | |
| 2007/0187509 A1 | 8/2007 | Kotlarsky et al. | |
| 2007/0199993 A1 | 8/2007 | Kotlarsky et al. | |
| 2007/0211148 A1 | 9/2007 | Lev et al. | |
| 2007/0242883 A1 | 10/2007 | Kruppa | |
| 2008/0099561 A1 | 5/2008 | Douma | |
| 2008/0203167 A1 | 8/2008 | Soule et al. | |
| 2008/0230615 A1 | 9/2008 | Read et al. | |
| 2008/0244714 A1 | 10/2008 | Kulakowski et al. | |
| 2008/0277475 A1 | 11/2008 | Kotlarsky et al. | |
| 2009/0176505 A1* | 7/2009 | Van Deventer | G06F 1/1626 455/456.1 |
| 2009/0308927 A1 | 12/2009 | Longacre, Jr. et al. | |
| 2010/0020970 A1 | 1/2010 | Liu et al. | |
| 2010/0030695 A1 | 2/2010 | Chen et al. | |
| 2010/0112279 A1 | 5/2010 | McIntosh | |
| 2010/0125497 A1 | 5/2010 | Arguello | |
| 2010/0210287 A1 | 8/2010 | De Vries et al. | |
| 2011/0000958 A1 | 1/2011 | Herzig | |
| 2011/0070829 A1 | 3/2011 | Griffin et al. | |
| 2011/0081860 A1 | 4/2011 | Brown et al. | |
| 2012/0045059 A1 | 2/2012 | Fujinami | |
| 2012/0077433 A1 | 3/2012 | Walker et al. | |
| 2012/0141660 A1* | 6/2012 | Fiedler | G06K 7/1434 427/8 |
| 2012/0198531 A1 | 8/2012 | Ort et al. | |
| 2012/0264401 A1 | 10/2012 | Hwang | |
| 2012/0292392 A1 | 11/2012 | Kim | |
| 2012/0298752 A1 | 11/2012 | Kim | |
| 2013/0031261 A1 | 1/2013 | Suggs | |
| 2013/0221083 A1 | 8/2013 | Doss et al. | |
| 2013/0240621 A1 | 9/2013 | Everett | |
| 2014/0004793 A1 | 1/2014 | Bandyopadhyay et al. | |
| 2014/0113550 A1 | 4/2014 | Li | |
| 2014/0117074 A1 | 5/2014 | Kim | |
| 2014/0330993 A1 | 11/2014 | Raz | |
| 2014/0334665 A1* | 11/2014 | Quinn | G06T 1/0085 382/100 |
| 2015/0138608 A1* | 5/2015 | Turner | G06K 1/121 358/3.28 |
| 2016/0267369 A1* | 9/2016 | Picard | G06K 7/1417 |

OTHER PUBLICATIONS

Devan A. Sandiford, USPTO Final Office Action, U.S. Appl. No. 13/412,792, Notification Date Sep. 5, 2014, 28 pages.

Devan A. Sandiford, USPTO Office Action, U.S. Appl. No. 13/412,792, Notification Date Dec. 3, 2014, 38 pages.

Devan A. Sandiford, USPTO Notice of Allowance and Fee(s) Due, U.S. Appl. No. 13/412,792, Date Mailed May 15, 2015, 10 pages.

Allyson Neel Trail, USPTO Office Action, U.S. Appl. No. 13/106,514, Mail Date Oct. 7, 2011, 12 pages.

Allyson Neel Trail, USPTO Notice of Allowance and Fee(s) Due, U.S. Appl. No. 13/106,514, Date Mailed Feb. 3, 2012, 8 pages.

Allyson Neel Trail, USPTO Office Action, U.S. Appl. No. 13/556,831, Mail Date Aug. 29, 2012, 14 pages.

Allyson Neel Trail, USPTO Notice of Allowance and Fee(s) Due, U.S. Appl. No. 13/556,831, Date Mailed Jan. 9, 2013, 14 pages.

David P. Tardif, USPTO Office Action, U.S. Appl. No. 13/661,443, Notification Date Oct. 7, 2013, 12 pages.

David P. Tardif, USPTO Office Action, U.S. Appl. No. 13/661,443, Notification Date Mar. 13, 2014, 15 pages.

David P. Tardif, USPTO Final Office Action, U.S. Appl. No. 13/661,443, Notification Date Oct. 22, 2014, 8 pages.

David P. Tardif, USPTO Office Action, U.S. Appl. No. 13/661,443, Notification Date Apr. 10, 2015, 8 pages.

David P. Tardif, USPTO Office Action, U.S. Appl. No. 13/661,443, Notification Date Sep. 12, 2016, 13 pages.

* cited by examiner

MOBILE DEVICE DIGITAL COMMUNICATION AND AUTHENTICATION METHODS

CROSS-REFERENCE TO RELATED APPLICATIONS

This application is a divisional application of commonly owned and co-pending patent application Ser. No. 13/412,792, entitled "MOBILE DEVICE DIGITAL COMMUNICATION AND AUTHENTICATION METHODS", filed on Mar. 6, 2012. The present invention is also related in some aspects to co-pending application Ser. No. 13/661,443, entitled "TIME-VARYING BARCODE IN AN ACTIVE DISPLAY", filed on Oct. 26, 2012. The present invention is also related in some aspects to application Ser. No. 13/556,831, entitled "TIME-VARYING BARCODE IN AN ACTIVE DISPLAY", filed on Jul. 24, 2012 (U.S. Pat. No. 8,408,462), and application Ser. No. 13/106,514, entitled "TIME-VARYING BARCODE IN AN ACTIVE DISPLAY", filed May 12, 2011 (U.S. Pat. No. 8,256,673), the entire contents of which are herein incorporated by reference.

FIELD OF THE INVENTION

In general, the present invention relates to mobile device digital communication and authentication methods therefor.

BACKGROUND OF THE INVENTION

Mobile terminal-to-terminal communication typically requires manual authorization. As such, it is subject to miscommunication and security breach. Moreover, wireless authentication protocols are subject to hacking, as there is no control over wave propagation direction. Machine readable codes are not human readable, and, therefore, they are not verified before use which causes security loop holes. Still yet, visual data communication codes involve extensive use of user screens. Such a requirement obstructs and suspends user's access to the terminal during communication.

U.S. Patent Application 20110000958 discloses a method and system for communicating encoded information through "animated" barcodes wherein a single bar code area on an electronics' display or television is scanned multiple times while the bar code area changes from one bar code image to another.

U.S. Patent Application 20100020970 discloses a system and method for creating a camera imaging data channel by encoding a sequence of bar codes from a display screen and captured by a camera, then decoded by software on a cell phone or similar device.

U.S. Patent Application 20060054695 discloses a dynamic bar code display apparatus that includes a storage medium and means for displaying at least two or more bar codes continuously.

U.S. Pat. Nos. 7,360,706 and 7,273,180 disclose a hand-supportable digital imaged-based bar code symbol reading device.

U.S. Pat. No. 5,591,952 discloses a bar code reader that utilizes a CCD imager device to capture the image, and the memory data from the imager device is analyzed to recognize and decode any symbols included within the image.

U.S. Pat. No. 5,278,397 discloses a multi-resolution bar code reader in which the bar code reader's optics and sensing elements are organized to send two channels of data derived from a bar code scan.

U.S. Pat. No. 5,073,954 discloses the bar code location and recognition processing system in which a bar code is optically scanned and a digital video processor converts the scan to binary data and determines the location and pattern of the bar code in the scan image.

U.S. Patent Application 20080277475 discloses a digital image capture and processing system that combines video and snapshot image captures into a single bar code data capture cycle.

U.S. Patent Application 20070199993 and U.S. Patent Application 20070187509 disclose a hand-supportable digital bar code reader that has multiple modes of image processing capabilities that include reading both 1D and 2D bar code symbols.

SUMMARY OF THE INVENTION

Embodiments of the present invention provide various approaches for mobile device intercommunication (e.g., digital) as well as various authentication methods. In one embodiment, the present invention provides direct line-of-sight visual digital communication between mobile devices for controlled security. In another embodiment, the present invention provides direct contact motion-based digital communication between mobile devices for controlled security. Embodiments of the present invention also provide various authentication methods. One such example relates to secure authentication code exchange with subsequent digital communications in one or more channels. In another example, human-readable information is used along machine-readable digital codes, e.g., quick response (QR) codes to verify visual codes. Still yet, embodiments of the present invention provide non-obtrusive visual codes that maintain a user's access to a mobile device screen.

A first aspect of the present invention provides a method for secure authentication and data exchange between user devices, comprising: exchanging a proximity authentication code between a first user device and a second user device, the proximity authentication code comprising at least one of the following: a visual authentication code, an audio authentication, or a vibrational authentication code; authenticating, responsive to the exchanging, the proximity authentication code; determining at least one communication channel for transferring data between the first user device and the second user device; and transferring data via the communication channel.

A second aspect of the present invention provides a method for authenticating a human-verifiable visual code, comprising: receiving a scan of the human-verifiable visual code with a user device, the human-verifiable visual code comprising a quick response (QR) code having human-readable characters integrated therewith; determining whether the QR code and the human-readable characters are consistent with one another; and executing the QR code if the QR code and the human-readable characters are consistent.

A third aspect of the present invention provides a method for non-intrusive bi-directional visual communication, comprising: displaying on a screen a series of temporary noise dots deviating from an ordinary display on the screen; capturing the screen with an image capture device; and determining a difference between the ordinary display and the temporary noise dots.

BRIEF DESCRIPTION OF THE DRAWINGS

These and other features of this invention will be more readily understood from the following detailed description of the various aspects of the invention taken in conjunction with the accompanying drawings in which.

Figure 1:
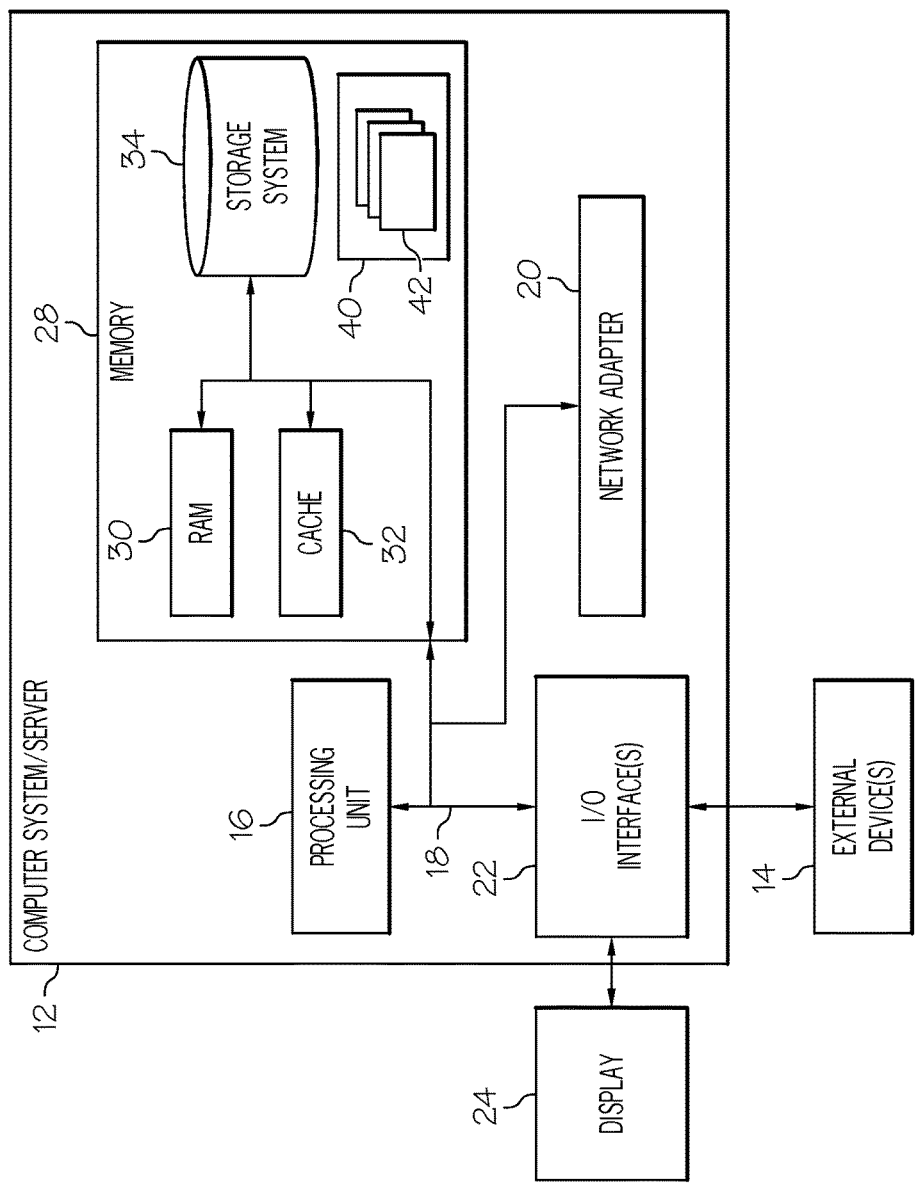
FIG. 1 depicts an illustrative mobile device according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As mentioned above, embodiments of the present invention provide various approaches for mobile device intercommunication (e.g., digital) as well as various authentication methods. In one embodiment, the present invention provides direct line-of-sight visual digital communication between mobile devices for controlled security. In another embodiment, the present invention provides direct contact motion-based digital communication between mobile devices for controlled security. Embodiments of the present invention also provide various authentication methods. One such example relates to secure authentication code exchange with subsequent digital communications in one or more channels. In another example, human-readable information is used along machine-readable digital codes (e.g., quick response (QR) codes to verify visual codes. Still yet, embodiments of the present invention provide non-obtrusive visual codes that maintain a user's access to a mobile device screen.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth herein.

In computing node 10, there is a mobile/user device 12, which is operational with numerous other general purpose or special purpose computing system environments or configurations. Examples of well-known computing systems, environments, and/or configurations that may be suitable for use with mobile device 12 include, but are not limited to, personal computer systems, server computer systems, thin clients, thick clients, hand-held or laptop devices, cellular phones, tablets, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Mobile device 12 may be described in the general context of computer system-executable instructions, such as program modules, being executed by a computer system. Generally, program modules may include routines, programs, objects, components, logic, data structures, and so on, that perform particular tasks or implement particular abstract data types. Mobile device 12 may be practiced in distributed computing environments where tasks are performed by remote processing devices that are linked through a communications network. In a distributed computing environment, program modules may be located in both local and remote computer system storage media including memory storage devices.

As shown in FIG. 1, mobile device 12 in computing node 10 is shown in the form of a general-purpose computing device. The components of mobile device 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Mobile device 12 typically includes a variety of computer system readable media. Such media may be any available media that is accessible by mobile device 12, and it includes both volatile and non-volatile media, removable and non-removable media.

System memory 28 can include computer system readable media in the form of volatile memory, such as random access memory (RAM) 30 and/or cache memory 32. Mobile device 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Device program/utility 40, having a set (at least one) of program modules 42, may be stored in memory 28 by way of example, and not limitation, as well as an operating system, one or more application programs, other program modules, and program data. In general, device program 40 performs the function of the present invention as described herein as well as all functionality traditionally provided by mobile devices as known in the art. Each of the operating system, one or more application programs, other program modules, and program data or some combination thereof, may include an implementation of a networking environment. Program modules 42 generally carry out the functions and/or methodologies of embodiments of the invention as described herein.

Mobile device 12 may also communicate with one or more external devices 14 such as a keyboard, a pointing device, a display 24, etc.; one or more devices that enable a consumer to interact with mobile device 12; and/or any devices (e.g., network card, modem, etc.) that enable mobile device 12 to communicate with one or more other computing devices. Such communication can occur via I/O interfaces 22. Still yet, mobile device 12 can communicate with one or more networks such as a local area network (LAN), a general wide area network (WAN), and/or a public network (e.g., the Internet) via network adapter 20. As depicted, network adapter 20 communicates with the other components of mobile device 12 via bus 18. It should be understood that although not shown, other hardware and/or software components could be used in conjunction with mobile device 12. Examples include, but are not limited to: microcode, device drivers, redundant processing units, external disk drive arrays, RAID systems, tape drives, and data archival storage systems, etc.

As discussed above, mobile device 12 comprises device program 40 having modules 42. Modules generally carry out the functionality discussed herein such as: exchanging a proximity authentication code (e.g., a visual authentication code, an audio authentication code, or a vibrational authentication code) between a first user device and a second user device; authenticating, responsive to the exchanging, the proximity authentication code; determining at least one communication channel for transferring data between the first user device and the second user device; transferring data via the communication channel; displaying an acknowledging code on a display of the second user device; recording the acknowledgement code with an image capture device of the first user device; playing an audio acknowledging code comprising a tonal sequence via a speaker of the second user device; capturing the audio acknowledgement code with a microphone of the first user device; outputting a vibrational acknowledging code comprising a vibrational sequence from the second user device; detecting the vibrational acknowledgement code via a motion sensor of the first user device; determining if the data has a size above a predetermined threshold, wherein the at least one communication channel is determined based on the size; activating a proximity exchange feature on the first user device and the second user device prior to the exchanging; establishing authentication and security information for the data transfer; receiving a user interactive authorization procedure; and/or communicating the proximity authentication code to a third user device from the first device;

It is understood that the visual authentication code may be displayed on a display of the first user device and recorded with an image capture device of the second user device. The audio authentication code may comprise a tonal sequence played via a speaker of the first user device that is captured with a microphone of the second user device. The vibrational authentication code may comprise a vibrational sequence outputted from the first user device that is detected via a motion sensor of the second user device. Still yet, various other features may be provided hereunder. For example: the first device and the second device may be configured to iteratively transfer the data and acknowledgement with one another; the acknowledgement code may be encrypted with a security code during setup; the proximity authentication code may be sent from first user device having a first device signal medium, and accepted by the second user device having a second device signal medium, wherein the first device signal medium and the second device signal medium are different; the second and a third user devices may receive separate proximity authentication codes from the first device; the proximity authentication code and the data may be communicated via at least one communication channel; the data being communication may occur via a first communication channel and the proximity authentication code being communicated via a second communication channel; the data may make hops among multiple or heterogeneous communication channels and media;

the data may be communicated via least two different communication channels and media simultaneously; the first device and the second device may autonomously determine whether the acknowledgement code is valid; the first device and the second device may request an additional acknowledgement code when received acknowledgement codes are not valid; and/or the first device and the second device are configured to request manual intervention and verification by a user when received acknowledgement codes are not valid.

In general, mobile device users will agree to exchange data, and first exchange security information and data abstraction by approaching their devices. Digital communication authentication codes, encryption keys, and data links or hyperlinks are exchanged in proximity through audio, visual, vibrational, etc., proximity exchanges. Subsequent data communication follows up with the same or auxiliary data channel(s), such as WiFi, bluetooth, visual, audio, motion, etc., from the original devices, or a designated place noted in the data link. Small amounts of data can be subsequently transferred using the same method used for security information exchange.

Figure 2:
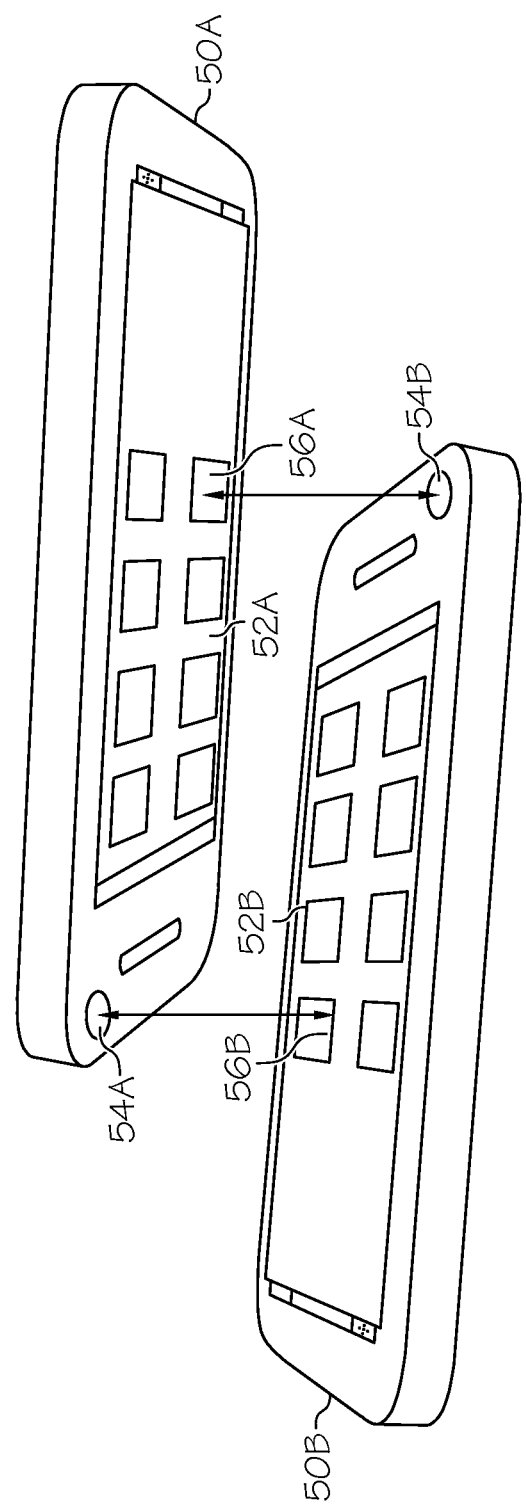
FIG. 2 depicts a first diagram of visual-based proximity data transmission according to an embodiment of the present invention.

Referring now to FIG. 2, a set of mobile/user devices 50A-B are shown. In general, each mobile device will comprise the following components among others): a transducer comprising a screen/display 52A-B; background light; a flash light; a mobile handset speaker and/or hands-free speaker; sensors; image capture device/camera 54A-B; an ambient light sensor; a mobile handset microphone; a direct contact and motion communication transducer and sensor; a vibration actuator; and a gyroscope and motion detection sensor.

Under an embodiment of the present invention, a visual authentication code 56A-B may be displayed on either screen 52A-B and captured by the image capture device 54A-B of the other device 50A-B. The visual authentication code 56A-B is typically a 2-dimensional shape/color pattern, etc., that may be used to authenticate access to a mobile device 50A-B. Specifically, the program 40 on the device that captures the image/code 56A-B will then process the same against a library of valid codes. If the code is valid, access to the device will be permitted, and an authentication code can then be automatically transmitted back to the mobile device that displayed the code 56A-B. Once authentication has occurred, data may be exchanged between mobile devices 50A-B. In general, this entails determining a communications channel(s) (e.g., based on the amount and/or type of data being transferred), and then transferring the data via the channel(s). These concepts will be further explained below in conjunction with FIGS. 7-9. In general, this embodiment entails the exchange of encoded visual images between two or more devices with visual input. In a typical embodiment, only the device(s) in the direct line of sight can engage visual communication. This configuration provides strict control for the communication participants. Radio-based wireless communication cannot control signal direction, and therefore cannot avoid unauthorized listeners. It is understood that the functionality discussed in conjunction with FIG. 1 (and enabled by program 40) may be provided for all mobile devices hereunder.

Figure 3:
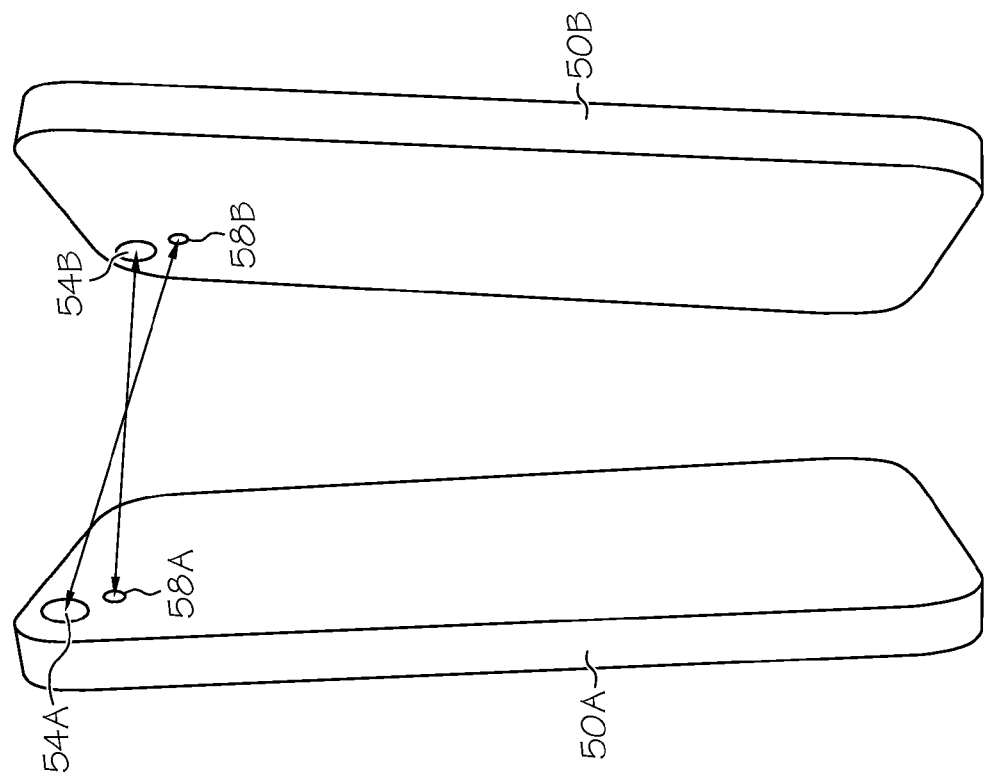
FIG. 3 depicts a second diagram of visual-based proximity data transmission according to an embodiment of the present invention.
Figure 4:
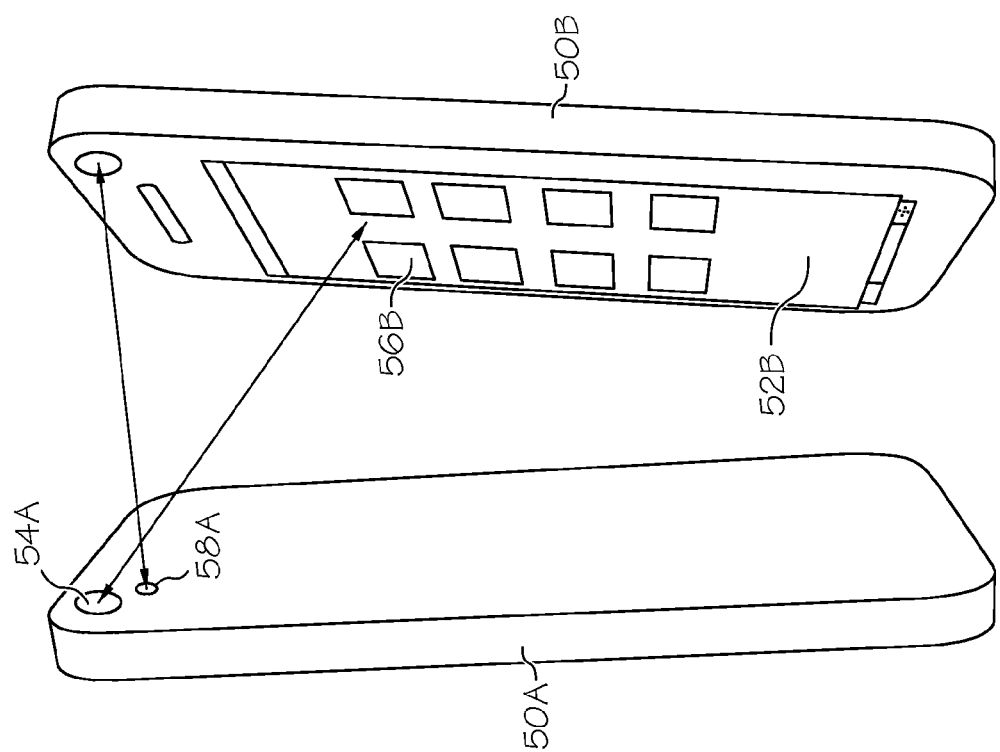
FIG. 4 depicts a third diagram of visual-based proximity data transmission according to an embodiment of the present invention.

FIGS. 3-4 demonstrate that different mobile device configurations may be accommodated hereunder. For example, as shown in FIG. 3, mobile devices 50A-B may have rear mounted cameras 54A-B and flashes 58A-B. As shown in FIG. 4, this may be accommodated hereunder. Specifically, camera 54A of mobile device 50A is placed in the line of sight with screen 52B of mobile device 50. This will allow image capture device 54A to capture visual authentication code 56B and authenticate device 50A and/or 50B accordingly. Once authentication and acknowledgement has occurred, data may be transferred via one or more communication channels.

Figure 5:
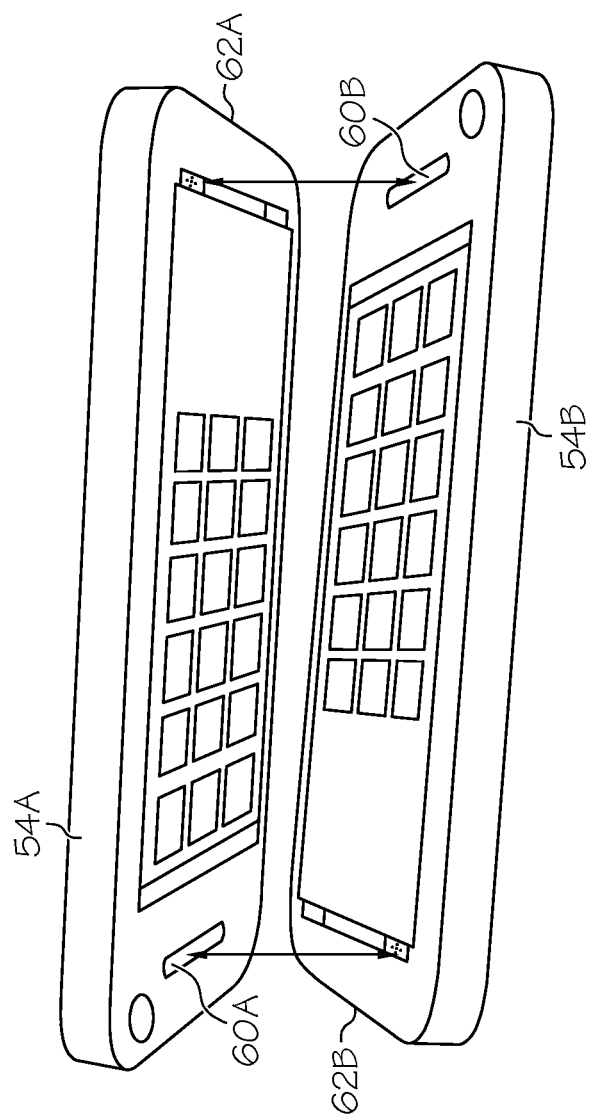
FIG. 5 depicts audio-based proximity data transmission according to an embodiment of the present invention.

FIG. 5 demonstrates that an audio authentication code may be utilized hereunder. In one embodiment, the audio authentication code may comprise a tonal sequence played via a speaker of the first mobile device that is captured with a microphone of the second mobile device. Specifically, as shown, each mobile device 50A-B may comprise speakers 60A-B and a microphone 62A-B. Either mobile device may emit audio authentication code via its speaker that is captured by the microphone of the other mobile device. The program 40 of the capturing device will compare the tonal sequence against a library of valid sequences. If the sequence is authenticated, an acknowledgement code (e.g., another audio code) may be played from the speaker of the capturing mobile device that is captured by the microphone of the mobile device that communicates the original audio authentication code. Once acknowledgement is confirmed, a communication channel(s) will be determined, and data transfer may occur therein.

Figure 6:
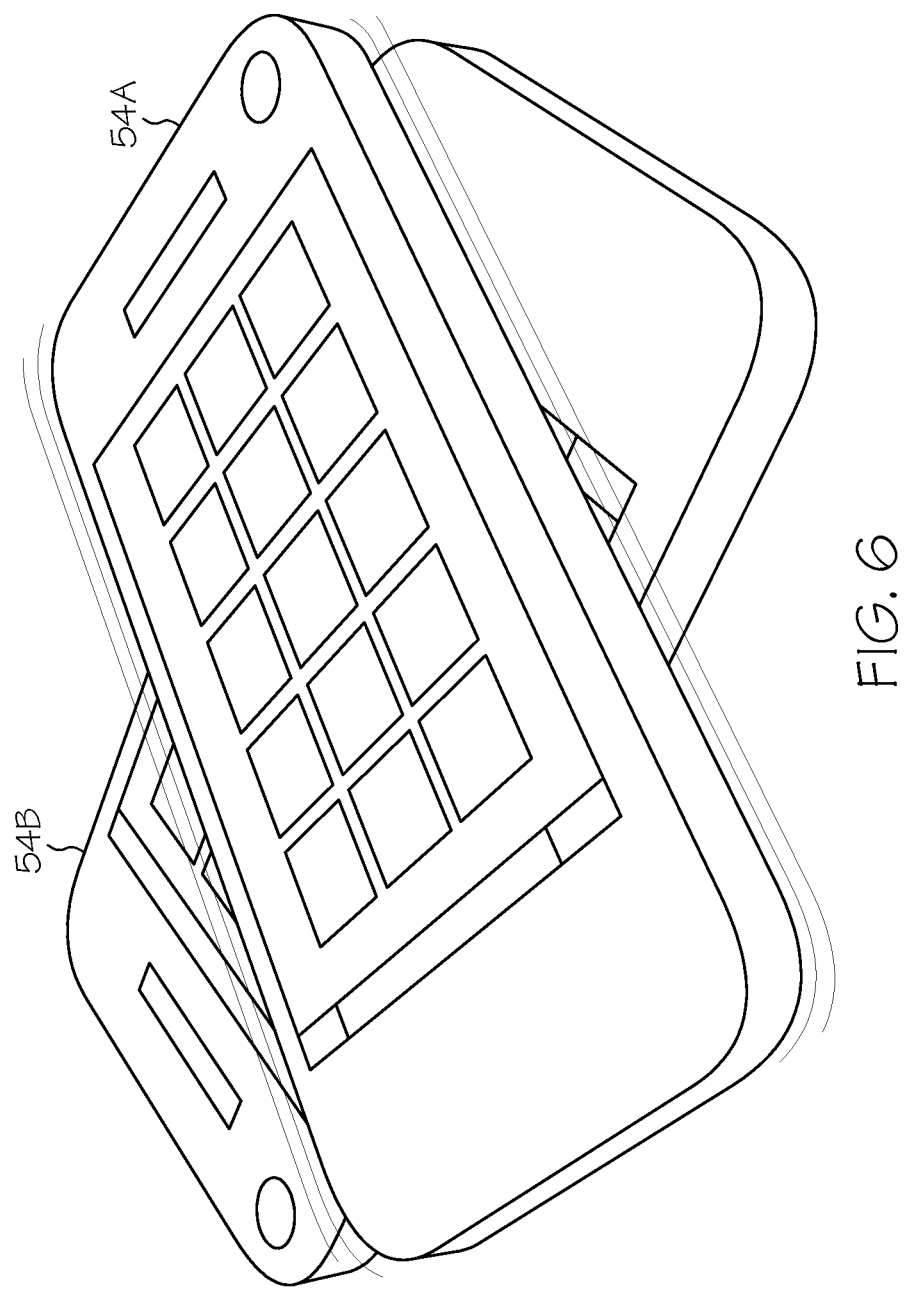
FIG. 6 depicts contact/vibration-based proximity data transmission according to an embodiment of the present invention.

FIG. 6 demonstrates that vibrational authentication codes may also be accommodated hereunder. A vibrational authentication code may comprise a motional or vibrational sequence outputted from the first mobile device 54A that is detected via a motion sensor of the second mobile device 54B. The detected sequence may similarly be compared against a library of valid sequences. If valid, a vibrational acknowledging code (e.g., comprising a vibrational sequence) may be emitted from the second mobile device 54B. Once authentication is confirmed, a communication channel(s) between the two devices 54A-B will be determined, and data transfer can occur therein.

Figure 7:
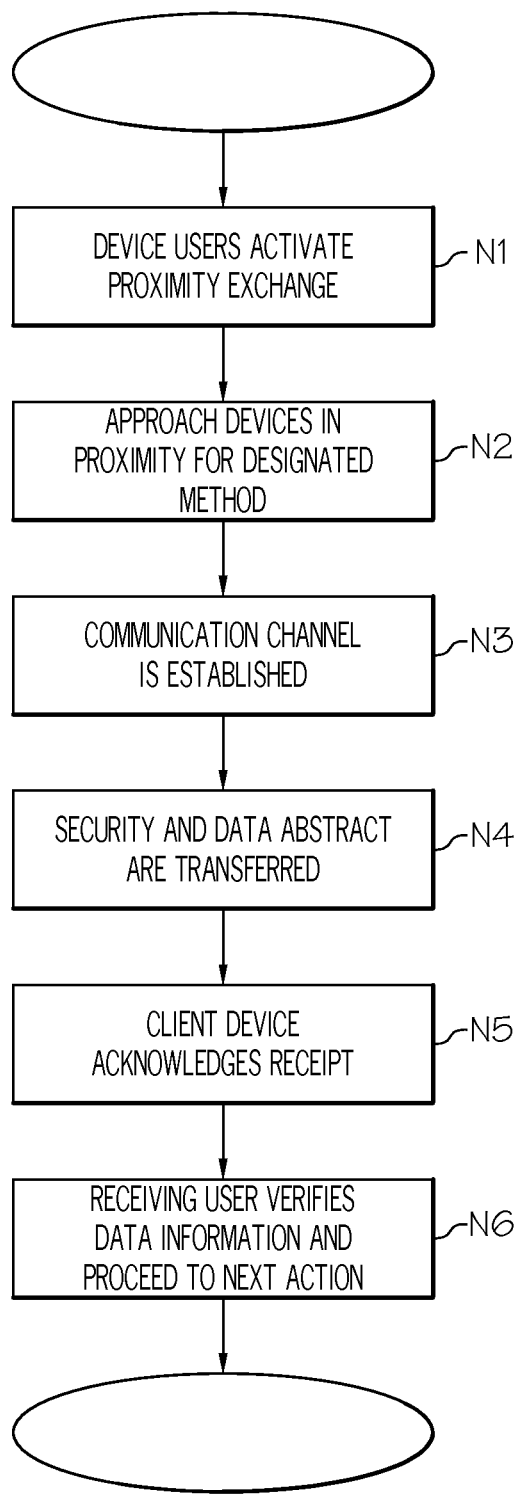
FIG. 7 depicts a first flow diagram according to an embodiment of the present invention.

Referring now to FIG. 7, a first method flow diagram further explaining the process involved with the various embodiments set forth above is shown. In step N1, device users activate the proximity exchange feature hereunder. In step N2, the devices are placed in proximity with one another in accordance with the chosen method (e.g., a visual authentication and acknowledgement, audio authentication and acknowledgement, a vibrational authentication acknowledgement, and/or a combination thereof. In step N3, a communication channel is established, and security protocols and data/data abstracts are exchanged therein in step N4. In step N5, the client device receiving the authentication code and/or data acknowledges the same. In step N6, the receiving user verifies the data information and the process proceeds accordingly.

Figure 8:
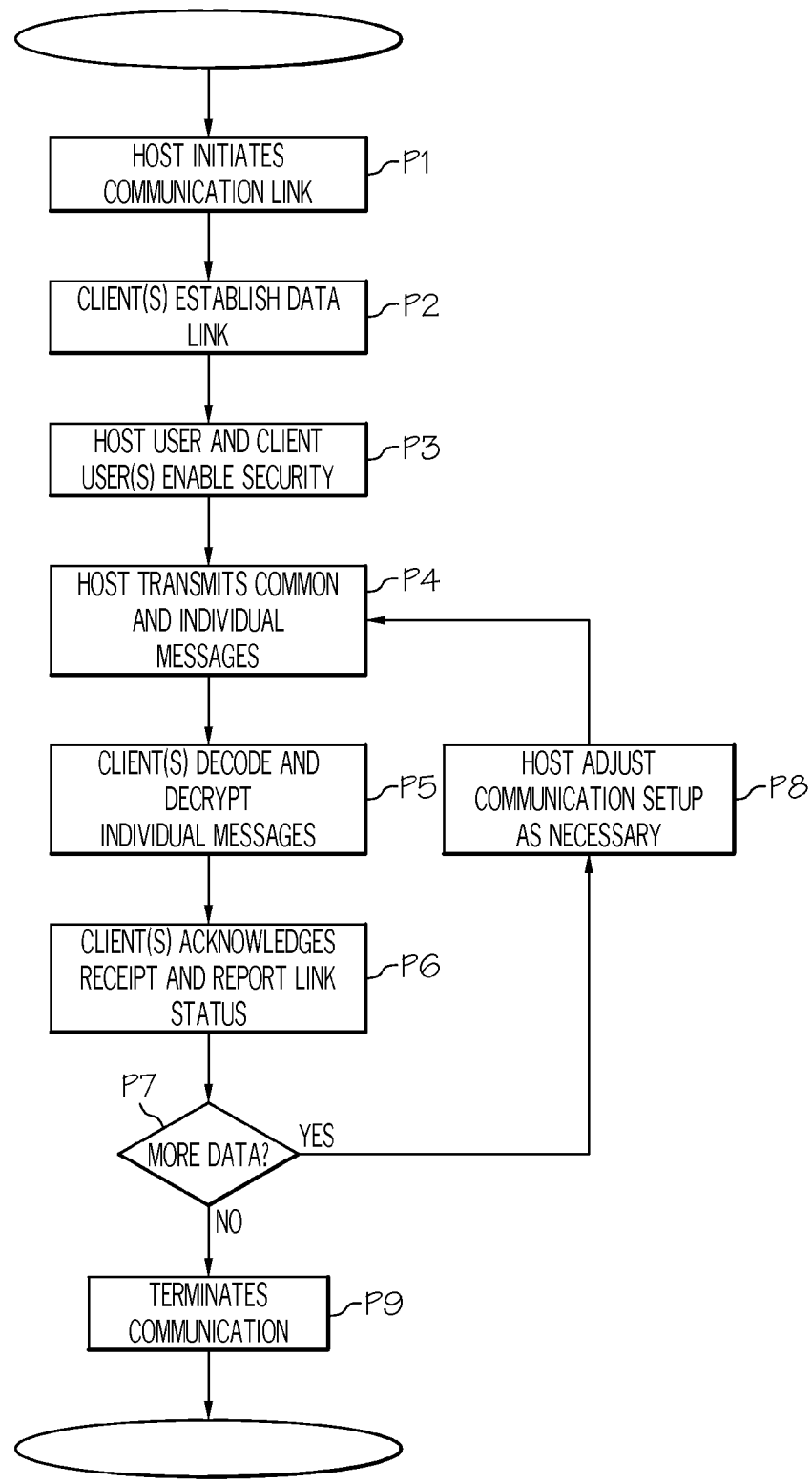
FIG. 8 depicts a second flow diagram according to an embodiment of the present invention.

A flow diagram describing inter-device communication is shown in FIG. 8. In this diagram, the mobile/user devices are referred to as host device and client device to better describe a direction of communication flow. In step P1, a host device initiates a communication link. In step P2, the clients/devices initiate a data link. In step P3, the host and client user enable device security. In step P4, the host device transmits encrypted common and individual messages. In step P5, the client device decodes and decrypts the messages. In step P6, the client device acknowledges receipt thereof and reports a link status back to the hose device. In step P7, it is determined whether data communication is complete. If not, the host may adjust the communication setup (e.g., channel(s), protocol(s), etc.) as necessary in step P8. Once data communication is complete, inter-device communication is terminated in step P9.

Figure 9:
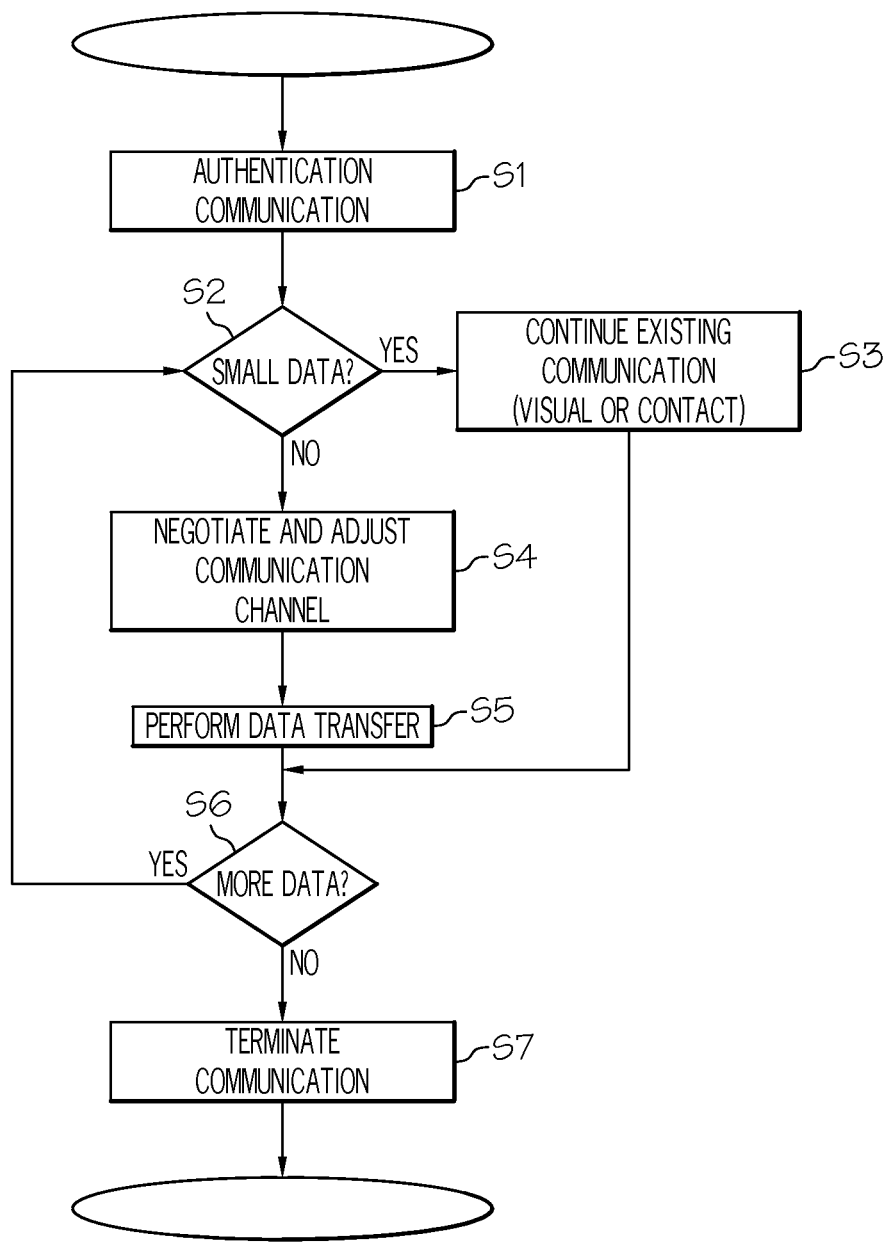
FIG. 9 depicts a third flow diagram according to an embodiment of the present invention.

Referring now to FIG. 9, a method flow diagram describing data transfer between the devices is shown. In step S1, authentication communication occurs. In step S2, it is determined whether the amount of data is above or below a predetermined threshold. If so, the existing communication channel (e.g., the channel used for initial inter-device authentication) can be used to transfer the data in step S3. If not, the communication channel can be adjusted (e.g., another channel can be negotiated) in step S4. In step S5, the data transfer is performed. Once it is determined in step S6 that no additional data need be transferred, the communication will be terminated in step S7.

Figure 10:
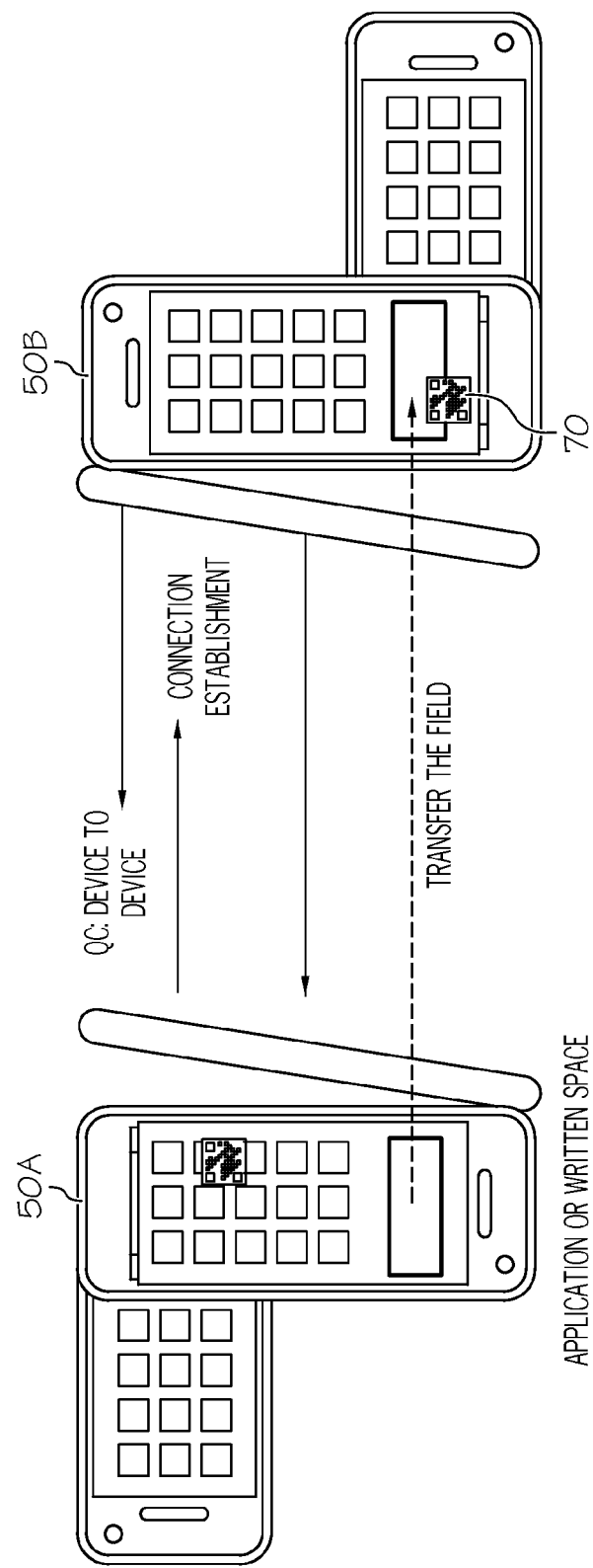
FIG. 10 depicts a diagram of human-verifiable visual code-based authentication according to an embodiment of the present invention.

Referring now to FIG. 10, an additional embodiment according to the present invention is shown. Specifically, authentication occurs via a human-verifiable visual code. In general, the human-verifiable visual code 70 comprises a quick response (QR) code having human-readable characters integrated therewith. As depicted, code 70 is displayed on the screen of mobile device 70B, and is scanned with the image capture device of mobile device 50A. Program 40 will then process code, while the user of device 50A reads the characters and confirms them on mobile device 50A. Code 70 is scanned. It may then be determined whether the QR code and the human-readable characters are consistent with one another. If so, the QR code may then be execute. If the two are not consistent with one another, the QR code will not be executed.

Figure 11:
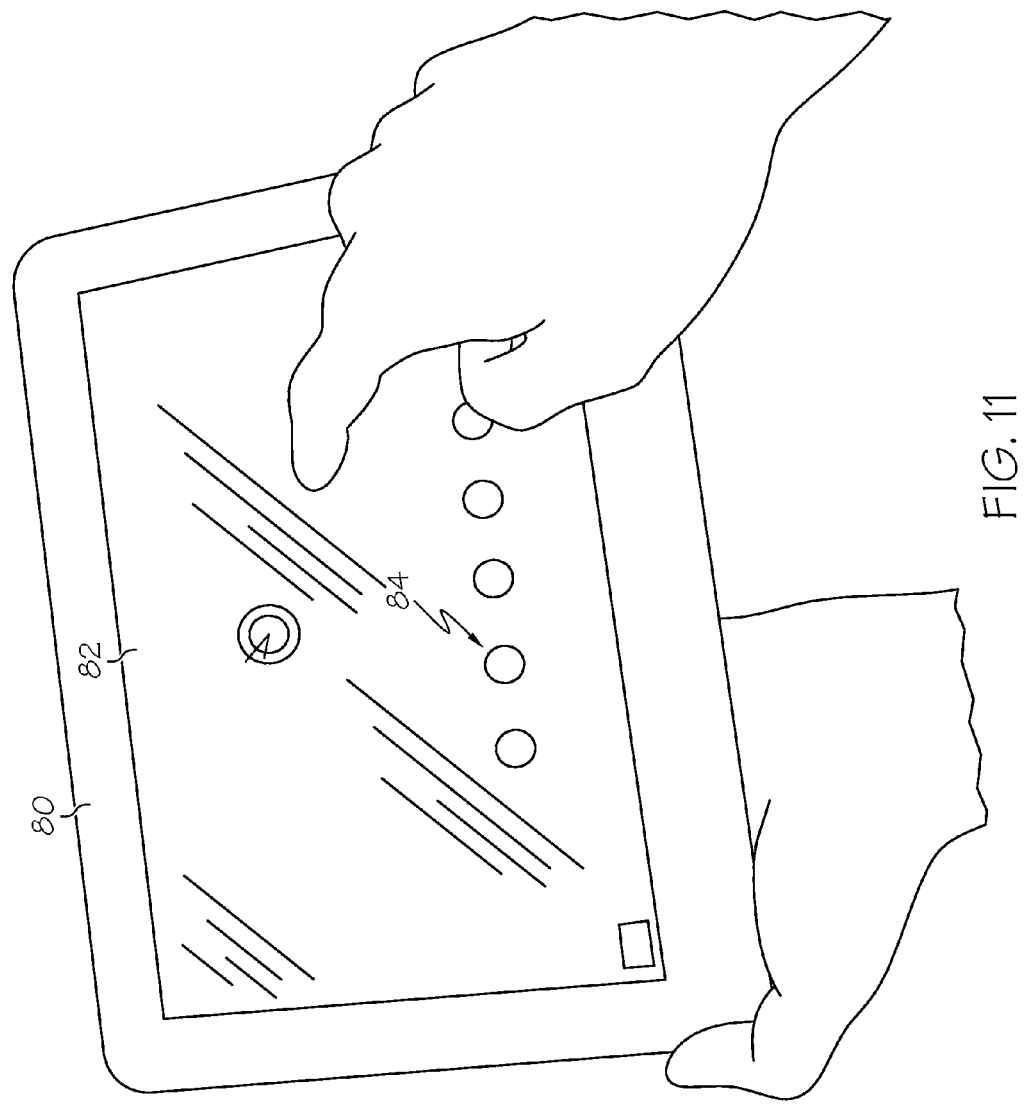
FIG. 11 depicts a diagram of non-obtrusive visual code-based authentication according to an embodiment of the present invention.

Referring now to FIG. 11, another embodiment according to the present invention is shown. As depicted, mobile device 80 (e.g., a tablet) comprises a screen 82. In this embodiment, screen 82 maintains original display (arbitrary), while introducing controlled and temporary noise dots 84 with varying colors, deviating from the original screen. The duration may be short in time, so that a user cannot effectively tell the modulation. Even if noticed, dots 84 will resemble low-level noise. An image capture device of a second device (not shown) will detect such variation in video/movie mode and calculate the effective differences and determine authentication for follow-up data transfer (e.g., as described hereinabove). Thus, the modulating dots can act as a visual authentication code similar to the still image discussed in FIGS. 2-4.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for non-intrusive bi-directional visual communication, comprising:
    displaying on a screen a series of temporary noise dots deviating from an ordinary display on the screen, the temporary noise dots comprising controlled low-level noise on the screen and the temporary noise dots having a time duration sufficiently short to prevent a user from effectively viewing the temporary noise dots;
    capturing the series on the screen with an image capture device; and
    determining a difference between the ordinary display and the temporary noise dots.

2. The method of claim 1, further comprising establishing authentication and security information for a data transfer.

3. The method of claim 1, further comprising receiving a user interactive authorization procedure.

4. A method for non-intrusive bi-directional visual communication, comprising:
    displaying on a screen a series of temporary noise dots deviating from an ordinary display on the screen;
    capturing the screen with an image capture device;
    determining a difference between the ordinary display and the temporary noise dots;
    communicating a proximity authentication code from a first device associated with the screen to a second device associated with the image capture device via the series of temporary noise dots;
    comparing, responsive to the communicating, the proximity authentication code at the second device against a library of valid codes;
    authenticating the proximity authentication code based on the comparing;
    communicating a data abstract between the first device and the second device;
    determining at least one communication channel for transferring data between the first device and the second device based on the data abstract, the determining comprising adjusting a communication setup of the communication channel, wherein the adjusting the communication setup comprises negotiating a protocol;
    transferring data via the adjusted communication setup of the communication channel; and
    acknowledging transfer of the data via a data acknowledgement code.

5. The method of claim 4, further comprising:
    displaying the acknowledgement code on a display of the second device; and
    recording the acknowledgement code with an image capture device of the first device.

6. The method of claim 4, wherein an acknowledgement code is encrypted with a security code during setup.

7. The method of claim 4, further comprising determining if the data has a size above a predetermined threshold, wherein the at least one communication channel is determined based on the size.

8. The method of claim 4, the first device and the second device comprising mobile devices.

9. The method of claim 4, further comprising communicating the proximity authentication code to a third device from the first device, wherein the second user device and the third user device receive separate proximity authentication codes from the first device.

10. The method of claim 4, the data being communicated via a first communication channel and the proximity authentication code being communicated via a second communication channel.

11. The method of claim 4, the data making hops among a plurality of communication channels.

12. The method of claim 4, wherein the first device and the second device autonomously determine whether an acknowledgement code is valid.

13. The method of claim 12, wherein, in response to the acknowledgement code determined not to be valid, the first device and the second device request an additional acknowledgement code.

14. The method of claim 4, wherein the first device and the second device are configured to request manual intervention and verification by a user in the case that a received acknowledgement code is not valid.

* * * * *